(12) United States Patent
Grah

(10) Patent No.: US 7,678,841 B2
(45) Date of Patent: *Mar. 16, 2010

(54) INCREASING THE GAS TRANSMISSION RATE OF A FILM COMPRISING FULLERENES

(75) Inventor: Michael D. Grah, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 1234 days.

This patent is subject to a terminal disclaimer.

(21) Appl. No.: 11/208,464

(22) Filed: Aug. 19, 2005

(65) Prior Publication Data

US 2007/0042089 A1 Feb. 22, 2007

(51) Int. Cl.
*C08F 2/46* (2006.01)
*C08F 2/48* (2006.01)
*C08J 3/28* (2006.01)

(52) U.S. Cl. .............. 522/73; 522/74; 522/71; 522/150; 522/151; 522/153; 522/154; 522/157; 522/162; 522/163; 426/107; 426/118; 264/473; 264/470; 264/494; 206/484; 206/484.1

(58) Field of Classification Search .............. 522/73, 522/74, 150, 151, 153, 154, 155, 157, 162, 522/163; 426/107, 118; 428/297.4, 299; 264/473, 470, 494; 206/484, 484.1
See application file for complete search history.

(56) References Cited

U.S. PATENT DOCUMENTS

| | | | |
|---|---|---|---|
| 4,335,935 A | 6/1982 | Pohlack | |
| 4,871,559 A | 10/1989 | Dunn et al. | |
| 5,110,530 A | 5/1992 | Havens | |
| 5,648,020 A | 7/1997 | Speer et al. | |
| 5,691,101 A | 11/1997 | Ushirogouchi et al. | |
| 5,753,088 A | 5/1998 | Olk | |
| 5,756,577 A | 5/1998 | Guterrez-Villarreal | |
| 5,993,942 A | 11/1999 | Bakker | |
| 6,063,243 A | 5/2000 | Zettl et al. | |
| 6,071,626 A | 6/2000 | Frisk | |
| 6,184,280 B1 | 2/2001 | Shibuta | |
| 6,188,043 B1 | 2/2001 | Owensby | |
| 6,251,522 B1 | 6/2001 | Tanaka et al. | |
| 6,265,466 B1 | 7/2001 | Glatkowski et al. | |
| 6,331,209 B1 | 12/2001 | Jang et al. | |
| 6,331,265 B1 | 12/2001 | Dupire et al. | |
| 6,333,016 B1 | 12/2001 | Resasco et al. | |
| 6,355,287 B2 | 3/2002 | Noel et al. | |
| 6,413,487 B1 | 7/2002 | Resasco et al. | |
| 6,426,134 B1 | 7/2002 | Lavin et al. | |
| 6,427,419 B2 | 8/2002 | Owensby | |
| 6,449,923 B1 | 9/2002 | Cook, Jr. et al. | |
| 6,451,175 B1 | 9/2002 | Lai | |
| 6,455,021 B1 | 9/2002 | Saito | |
| 6,517,800 B1 | 2/2003 | Cheng et al. | |
| 6,541,744 B2 | 4/2003 | Von Arx et al. | |
| 6,861,135 B2 | 3/2005 | Zhou | |
| 6,861,481 B2 | 3/2005 | Ding et al. | |
| 7,163,967 B2 * | 1/2007 | Grah et al. ............... 522/71 |
| 2002/0025490 A1 | 2/2002 | Shchegolikhin et al. | |
| 2002/0040900 A1 | 4/2002 | Arx et al. | |
| 2002/0065346 A1 | 5/2002 | Murschall et al. | |
| 2002/0122765 A1 | 9/2002 | Horiuchi et al. | |
| 2002/0135105 A1 | 9/2002 | Easter | |
| 2002/0150678 A1 | 10/2002 | Cramer et al. | |
| 2002/0197923 A1 | 12/2002 | Tobita et al. | |
| 2003/0008123 A1 | 1/2003 | Glatkowski et al. | |
| 2003/0100654 A1 | 5/2003 | Chheang et al. | |
| 2003/0104190 A1 | 6/2003 | Zhou | |
| 2003/0158323 A1 | 8/2003 | Connell et al. | |
| 2004/0121144 A1 | 6/2004 | Zhou | |
| 2004/0241482 A1 * | 12/2004 | Grah et al. ............ 428/518 |
| 2004/0254282 A1 | 12/2004 | Suzuki et al. | |
| 2005/0119364 A1 | 6/2005 | Grah et al. | |
| 2005/0142313 A1 | 6/2005 | Grah | |
| 2005/0244664 A1 | 11/2005 | Bekele et al. | |
| 2006/0083940 A1 | 4/2006 | Bekele | |

FOREIGN PATENT DOCUMENTS

| | | | |
|---|---|---|---|
| EP | 0 308 106 A2 | 3/1989 |
| EP | 0 308 106 A3 | 3/1989 |

(Continued)

OTHER PUBLICATIONS

Matsui et al "Effect of Ultraviolet Light Irradiation on Gas Permeability in Polyimide Membranes . . . " Journal of Polymer Science: Part B: Polymer Physics, vol. 35, 2259-2269 (Jan. 1997).

(Continued)

*Primary Examiner*—Sanza L McClendon
(74) *Attorney, Agent, or Firm*—Daniel B. Ruble

(57) ABSTRACT

A method of increasing the gas transmission rate of a packaging film comprises providing a packaging film that comprises at least about 0.001 weight % of fullerene material selected from spherical fullerenes, bowl-shaped fullerenes, multi-walled carbon nanotubes, carbon nanocones, and carbon nano-onions. The packaging film is exposed to an amount of radiation energy effective to increase the oxygen transmission rate of the packaging film by at least about 100 cc (STP)/m2. day (1 atm, 0% RH, 23° C.).

51 Claims, 1 Drawing Sheet

FOREIGN PATENT DOCUMENTS

| | | |
|---|---|---|
| EP | 1 018 487 A1 | 7/2000 |
| EP | 1 054 036 A1 | 11/2000 |
| EP | 1 447 427 A1 | 8/2004 |
| EP | 1 541 322 A2 | 6/2005 |
| GB | 1 528 193 | 10/1978 |
| JP | 55079209 | 6/1980 |
| JP | 2000-204272 | 7/2000 |
| JP | 2003082202 | 3/2003 |
| JP | 2003138040 | 5/2003 |
| JP | 2003 334898 A | 11/2003 |
| JP | 2005200635 * | 7/2005 |
| WO | 97/15934 | 1/1997 |
| WO | 97/07069 | 2/1997 |
| WO | 01/92381 A1 | 12/2001 |
| WO | 03/026532 A2 | 4/2003 |
| WO | 2005/066248 A1 | 7/2005 |

OTHER PUBLICATIONS

Chivers "Easy removal of pressure sensitive adhesives for skin applications" International Journal of Adhesoin & Adhesives 21, p. 381-88 (Jan. 2001).

Chivers et al "Investigations into the mechanism of adhesion of a novel light-deactivatable pressure-sensitive adhesive" Adhesion '99 Conference Pre-Prints, 7th International Conference on Adhesion and Adhesives, p. 37-42 (Sep. 15-17, 1999).

Tikhomirova et al, "Reversible changes in the gaseous permeability of polymers during gamma-irradiation" L. Ya. Karpov Physical Chemistry Institute and the Institute of Plastic Industry, Proceeding of the Academy of Sciences of the USSR, Physical Chemistry Section, English Translation, vol. 130, No. 5, pp. 1081-84 1950, translation vol. 130 Nos. 1-6, pp. 171-174 Jan.-Feb. 1960.

Ullmann's Encyclopedia of Industrial Chemistry, vol. 6, pp. 370-378 (6th edition Jan. 2003).

P. McEuen et al., "Single-Walled Carbon Nanotube Electronics," IEEE Transactions on Nanotechnology, vol. 1, Mar. 2002, pp. 78-85.

X. Liu et al., Molecular Nanoelectronics, Chapter 1 "Carbon Nanotubes: Synthesis, Devices, and Integrated Systems," pp. 1-20 (Jan. 2003).

I. Alexandro et al, "Calculation of teh electronic structure of carbon films using electron energy loss spectroscopy," Ultramicroscopy, Nov. 2001; 90 (1) pp. 39-45 Abstract.

D. Kasuya et al, "Formation of $C_{60}$ using $CO_2$ laser vaporization of graphite at room temperature," Chemical Physics Letters 337 (Mar. 30, 2001) pp. 25-30.

C. Zhu et al, "Anti-infrared/ultraviolet property of fullerene-containing polyacrylate film," Plastics, Rubbers, and Composites, vol. 33, No. 8, p. 335-37, Apr. 2004.

"Polymeric Carbon Nanocomposites from Carbon Nanotubes Functionalized with Matrix Polymer", Macromolecules, 2003, 36, pp. 7199-7204.

"Nanotubes in a Flash—Ignition and Reconstruction", Ajayan et al, Science, vol. 296, Apr. 26, 2002, p. 705.

Michael J. Pepka, "Single Wall Nanohorns and High Density Polyethylene Composite," NanoCraft, Inc. Renton, Washington, Presentation at 2005 Soc. for the Advancement of Material and Process Engr. (SAMPE) Conference (May 1-5, 2005; Long Beach, California), 6 pages.

NanoForum Canada: Talk "Molecular electronics of AlQ3 and C60 using engineered contacts" Chandre Dharma-wardana (IMS, NRC, Ottawa), Marek Zgierski (SIMS, NRC, Ottawa), Zhen-Hong Lu (University of Toronto) Presented at NanoForum Canada, Nanoscience & Nanotechnology Forum (Jun. 16, 2005; Montreal, Canada); http://www.physics.mcgill.ca/NanoForum/abs/abs-chandre.dharma-wardana-nrc.ca-0.html.

Tobias Hertel, et al "Spectroscopy of single- and double-wall carbon nanotubes in different environments", five pages, published Mar. 2005.

Michael S. Fuhrer, "Carbon Nanotube Electronics" Carbon Nanotube Electronics Research—Fuhrer Group; Department of Physics, University of Maryland; printed from internet Jul. 13, 2005 (12 pages); http://www.physics.umd.edu/condmat/mfuhrer/ntresearch.htm; Department of Physics and Center for Superconductivity Research; University of Maryland at College Park; College Park, MD 20742-4111.

Lawrence T. Scott, "Fragments of fullerenes: novel syntheses, structures and reactions," Pure and Appl. Chem., vol. 68, No. 2, pp. 291-300 (Jan. 1996).

Lawrence T. Scott et al., "Geodesic polyarenes with exposed concave surfaces," Pure & Appl. Chem., vol. 71, No. 2, pp. 209-219 (Jan. 1999).

Andreas Hirsch and Michael Brettreich, "Fullerenes: Chemistry and Reactions," Table of Contents and Chapter 1: "Parent Fullerenes," pp. 1-48 (2005).

Koerner et al, "Remotely actuated polymer nanocomposites . . . " Nature Materials, vol. 3, p. 115-120 (Feb. 2004).

* cited by examiner

INCREASING THE GAS TRANSMISSION RATE OF A FILM COMPRISING FULLERENES

BACKGROUND OF THE INVENTION

The present invention relates to packaging films, and more particularly to a method of increasing the gas transmission rate of a packaging film.

It is sometimes useful to package a product within a packaging atmosphere that is different from the composition (e.g., oxygen content) and/or condition (e.g., pressure) of ambient air. For example, fresh red meat may be packaged within a modified atmosphere to extend the shelf life of the packaged fresh red meat. The modified atmosphere may be one having a low amount of oxygen, such as less than about 0.5 volume % oxygen or less than about 0.05 volume % oxygen.

However, fresh red meat packaged in a low-oxygen atmosphere typically has a purple color that may displease retail customers. Therefore, it may be desirable to allow the composition and/or conditions of the modified atmosphere within the package to approach that of ambient air after the package arrives at a supermarket or other retail outlet. For example, oxygen from ambient air may be allowed to reach the interior of the package in order to cause the meat to "bloom" to a red color suitable for retail display.

Several package designs provide for transportation of a food product in a low-oxygen environment, and for the quick introduction of oxygen to allow the food product to bloom at the retail outlet before display to the consumer. See, for example, U.S. Pat. Nos. 5,591,468; 5,686,126; 5,779,050; 5,919,547; and 6,032,800; each of which is incorporated herein in its entirety by reference.

Such packages may include a peelable laminate, for example a laminate that may be separated (e.g., hand peeled) into a relatively oxygen-permeable film and a relatively oxygen-impermeable film. Such a laminate may be sealed to a support member—such as a tray supporting a fresh red meat product—to form a low-oxygen modified-atmosphere, closed package having a relatively low oxygen-transmission rate to maintain the internal modified atmosphere in its modified condition. At the retail outlet, the relatively oxygen-impermeable film may be peeled from the laminate leaving the relatively oxygen-permeable film sealed to the tray—resulting in a closed package having a relatively high oxygen transmission rate through the film, so that oxygen relatively quickly transfers through the film to bloom the meat to a bright red. However, a drawback to such systems is the requirement for peeling the relatively oxygen-impermeable film from the laminate.

SUMMARY OF THE INVENTION

The present invention addresses one or more of the aforementioned problems. One embodiment is a method of increasing the gas transmission rate of a packaging film. A packaging film is provided, which comprises at least about 0.001 weight % of fullerene material based on the weight of the film. The fullerene material is selected from one or more of spherical fullerenes, bowl-shaped fullerenes, multi-walled carbon nanotubes, carbon nanocones, and carbon nano-onions. The packaging film is exposed to an amount of radiation energy effective to increase the oxygen transmission rate of the packaging film by at least about 100 cubic centimeters (at standard temperature and pressure) per square meter per day per 1 atmosphere of oxygen pressure differential measured at 0% relative humidity and 23° C.

Another embodiment of the invention is a packaging film comprising at least one layer comprising 100 weight parts of oxygen barrier polymer selected from one or more of ethylene/vinyl alcohol copolymer, polyvinyl alcohol, vinylidene chloride polymer, polyalkylene carbonate, polyester, polyacrylonitrile, and polyamide. The at least one layer also comprises at least about 0.001 weight parts of fullerene material per 100 weight parts oxygen barrier polymer. The fullerene material is selected from one or more of spherical fullerenes, bowl-shaped fullerenes, multi-walled carbon nanotubes, carbon nanocones, and carbon nano-onions.

Still another embodiment of the invention is a packaging film comprising at least one layer. One or more discontinuous regions are supported by the at least one layer of the film. The one or more discontinuous regions comprise at least about 0.001 weight % of fullerene material based on the weight of the film. The fullerene material is selected from one or more of spherical fullerenes, bowl-shaped fullerenes, multi-walled carbon nanotubes, carbon nanocones, and carbon nano-onions.

These and other objects, advantages, and features of the invention may be more readily understood and appreciated by reference to the detailed description of the invention and the drawings.

DETAILED DESCRIPTION OF THE INVENTION

Figure 1:
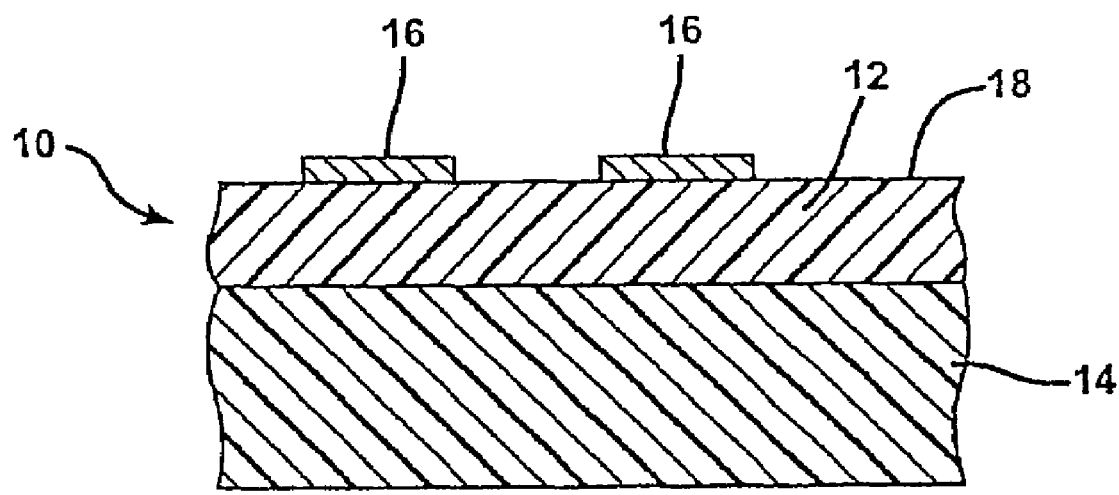
FIG. 1 is a representational cross-section of a packaging film of one embodiment of the invention.

A packaging film may comprise fullerene material selected from one or more of spherical fullerenes, bowl-shaped fullerenes, multi-walled carbon nanotubes, carbon nanocones, and carbon nano-onions. The gas transmission rate of the film may be increased by exposing the film to an effective amount of radiation energy.

Packaging Film

A packaging film is a film that comprises one or more polymers and that is useful as part of a package or packaging system. For example, any of the following may comprise a packaging film: bags, bottles, casings, containers, laminates, lids, liners, pouches, receptacles, trays, tubes, formed or non-formed webs, and wraps.

The packaging film may have any total thickness as long as it provides the desired properties (e.g., flexibility, Young's modulus, optics, strength, barrier) for the given packaging application of expected use. The film may have a thickness of less than about any of the following: 20 mils, 10 mils, 5 mils, 4 mils, 3 mils, 2 mils, 1.5 mils, 1.2 mils, and 1 mils. The film may also have a thickness of at least about any of the following: 0.25 mils, 0.3 mils, 0.35 mils, 0.4 mils, 0.45 mils, 0.5 mils, 0.6 mils, 0.75 mils, 0.8 mils, 0.9 mils, 1 mil, 1.2 mils, 1.4 mils, and 1.5 mils.

The packaging film may be monolayer or multilayer. The film may comprise at least any of the following number of layers: 2, 3, 4, and 5. The film may comprise at most any of the following number of layers: 20, 15, 10, 9, 7, 5, 3, 2, and 1. The term "layer" refers to a discrete film component which is coextensive with the film and has a substantially uniform composition. Any of the layers of the film may have a thickness of at least about any of the following: 0.05, 0.1, 0.2, 0.5, and 1 mil. Any of the layers of the film may have a thickness of at most about any of the following: 5 mils, 2 mils, and 0.5 mils. Any of the layers of the film may have a thickness as a percentage of the total thickness of the film of at least about any of the following values: 1, 3, 5, 7, 10, 15, and 20%. Any of the layers of the film may have a thickness as a percentage of the total thickness of the film of at most about any of the following values: 80, 50, 40, 35, and 30%.

The packaging film or a particular layer of the packaging film may have a composition such that any of the below described polymers comprises at least about any of the following weight percent values: 30, 40, 45, 50, 55, 60, 65, 70, 75, 80, 85, 90, 95, 97, 99 and 100% by weight of the film or by weight of a particular layer.

The packaging film or any of the particular layers of the packaging film discussed below may be unperforated. As used herein, "unperforated" means that the film (or layer) is substantially devoid of apertures extending through the thickness of the film (or layer). After the radiation energy exposing step discussed below, the packaging film or any of the particular layers of the packaging film discussed below may be perforated (e.g., with a plurality of apertures) or may be unperforated.

Fullerene Material

Fullerene material includes spherical fullerenes, bowl-shaped fullerenes, multi-walled carbon nanotubes, carbon nanocones, and carbon nano-onions.

Spherical fullerenes include closed-cage spheroidal aromatic carbon molecules of an even numbers of carbons, which include five-membered carbon rings and typically also six-membered carbon rings. Spherical fullerenes have the formula $C_n$, where, for example, n may be any of the even numbers from 20 to 190, except 22. Spherical fullerenes may comprise 12 pentagonal rings and a number of hexagonal rings equal to $(C_n-20)/2$. The $C_{60}$ fullerene (i.e., [60]fullerene), which is also known as "buckminsterfullerene" or "buckyball," may be considered a spherical aromatic molecule with a hollow truncated-icosahedron structure with an $I_h$ symmetry group, similar to a soccer ball. Other spherical fullerenes include $C_{70}$ (e.g., [70-$D_{5h}$]fullerene), $C_{76}$ (e.g., [76-$D_{2v}$]fullerene), $C_{78}$ (e.g., [78-$D_3$]fullerene, [78-$C_{2v(1)}$]fullerene, and [78-$C_{2v(2)}$]fullerene), $C_{80}$ (e.g., [80-$D_2$]fullerene), $C_{82}$, $C_{84}$ (e.g., [84-$D_{2d}$]fullerene, $C_{90}$, and $C_{96}$. The spherical fullerenes may comprise, for example, any of at least 20, 30, 40, 50, 60, 70, 80, 90, and 100 carbons; and/or at most 190, 150, 120, 100, 90, 80, 70, and 60 carbons.

Bowl-shaped fullerenes include molecules that may be referred to as bowl-shaped fullerene fragments, bowl-shaped polycyclic aromatic hydrocarbons, open geodesic polyarenes, bowl-shaped polyarenes, and buckeybowls. Whereas spherical fullerenes may be considered as having a "closed surface" or being "closed," that is, having an interior concave surface enclosed within the spherical molecular structure, a bowl-shaped fullerene has both its convex and concave surfaces exposed. Examples of bowl-shaped fullerenes include $C_{20}H_{10}$ (corannulene), $C_{26}H_{12}$, and $C_{36}H_{12}$ (circumtrindene). The bowl-shaped fullerenes may comprise any of at least 20, 30, 40, 50, 60, 70, 80, 90, and 100 carbons; and/or at most 190, 150, 120, 100, 90, 80, 70, 60, 50, 40, 30, and 20 carbons. Bowl-shaped fullerenes are described, for example, in L. Scott, H. Bronstein, et al. "Geodesic polyarenes with exposed concave surfaces" Pure & Appl. Chem., Vol. 71, No. 2, pp. 209-219 (1999), and L. Scott, "Fragments of fullerenes: novel synthesis, structures, and reactions" Pure & Appl. Chem., Vol. 68, No. 2, pp. 291-300 (1996), each of which is incorporated herein in is entirety by reference.

Multi-walled carbon nanotubes ("MWNTs") may also be referred to as multilayered carbon nanotubes or buckeytubes. MWNTs have a molecular configuration of two or more coaxial tubes and a hollow core. Each tube may be considered a graphene sheet rolled into a cylinder. The tube may be closed at one or both ends, for example, by a hemi-fullerene end cap, or one or both ends of the tube may be open. The average outer diameter of the MWNTs may be at most about any of the following: 50, 40, 30, 20, 10, 5, 3, and 2 nm; and may be at least about any of the following: 0.4, 1, 2, 3, 5, 10, 15, and 20 nm. The ratio of average tube length of MWNTs to the average diameter of the MWNTs may be at least about any of the following: 1.5, 2, 3, 5, 8, 10, 20, 100, 500, 1,000, 5,000, 10,000, 50,000, 100,000, and 1,000,000; and may be at most about any of the following: 5, 8, 10, 20, 100, 500, 1,000, 5,000, 10,000, and 20,000. The MWNTs may have, for example, a length of up to 1,000,000 nm, an outer diameter of from 0.6 to 20 nm, and an inner diameter of between 0.4 and 3 nm. The MWNTs may have any of the following numbers of coaxial tubes: at least 2, 3, 4, 5, 6, 8, 10, 12, 14, 18, 20, 16, 30, and 40 coaxial tubes; and/or at most 60, 46, 40, 36, 30, 26, 20, 16, 14, 12, 10, 8, 6, 5, 4, 3, and 2 coaxial tubes.

Carbon nanocones (i.e., carbon nanohorns) may comprise single-walled carbon nanohorns ("SWNH"). The carbon nanocones may comprise any of at least 1, 2, 3, 4, 5, 6, 8, 10, 12, 14, 18, 20, 16, 30, and 40 graphene layers; and/or at most 60, 46, 40, 36, 30, 26, 20, 16, 14, 12, 10, 8, 6, 5, 4, 3, and 2 graphene layers. Carbon nanocones are available, for example, from NanoCraft, Inc. (Renton, Wash.).

Carbon nano-onions (i.e., "buckeyonions") comprise concentric hollow carbon spheres with an onion-like structure. The innermost sphere of the nano-onion may correspond to any of the spherical fullerenes discussed above, for example, [60]fullerene or [70]fullerene. The nano-onion may comprise at least 2, 3, 4, 5, 6, 8, 10, 12, 14, 18, 20, 16, 30, and 40 concentric spheres; and/or at most 60, 46, 40, 36, 30, 26, 20, 16, 14, 12, 10, 8, 6, 5, 4, 3, and 2 concentric spheres.

Fullerene material may comprise several different isomers. Fullerene material comprising tubular sections may exhibit chirality.

Methods of manufacturing the fullerene material are known to those of skill in the art, and include resistive, arc, solar, or inductive heating of graphite, synthesis by combustion, and pyrolysis of naphthalene or other hydrocarbons, carbon vapor deposition, carbon dioxide laser vaporization of graphite, and carbon ion bombardment. For example, carbon nano-onions may be formed by intense e-beam irradiation of carbon particles, by shock-wave treatment of carbon soot, from carbon exposed to a plasma torch, by laser melting of carbon, and by annealing nanodiamonds at temperatures above 1,000° C. Carbon nanocones may be formed in a carbon arc. Bowl-shaped fullerenes may be synthesized, for example, by flash vacuum pyrolysis of appropriate precursors. See, for example, the L. Scott references cited above. Methods of manufacturing fullerene material are discussed, for example, in Ullmann's Encyclopedia of Industrial Chemistry, volume 6, pp. 370-78 ($6^{th}$ edition 2003), of which pages 370-78 are incorporated herein by reference, and in Andreas Hirsch and Michael Brettreich, "Fullerenes: Chemistry and Reactions" (January 2005 Wiley Press), which is incorporated herein in its entirety by reference.

The fullerene material may comprise, or may consist essentially of, any one, two, three, four, or five of any of the fullerene materials (e.g., spherical fullerenes, bowl-shaped fullerenes, MWNT, carbon nanocons, SWNHs, carbon nano-onions) discussed in this Application. For example, the fullerene material may consist essentially of spherical fullerenes comprising at least 70 carbons. Further, the fullerene material may comprise at least any of the following: two, three, four, and five types of any of the fullerene materials discussed in this Application. For example, the fullerene material may comprise spherical fullerenes and MWNTs; or, for example, the fullerene material may comprise $C_{60}$ and $C_{70}$ spherical fullerenes.

Fullerene material may comprise modified fullerene material, which is fullerene material that is modified (e.g., functionalized or derivatized), for example, by addition reactions to form substituted fullerene materials, by hydrogenation (e.g., partial hydrogenation), by halogenation, by reduction (e.g., by alkali or alkali earth metals), or functionalization with PVOH- or EVOH-containing copolymers. At least a portion of the fullerene material may be modified. The functionalized fullerene material may be chemically bonded to or within one or more chains of a polymer. For example, the functionalized fullerene material may bear a carboxyl group that can serve as a chain-terminating group of a polymer chain, or may bear more than one carboxyl group, and through copolymerization may reside at the end of or within a polymer chain. A functionalized fullerene material may reside at the end of polymer chains, within the polymer chains, or both.

The fullerene material may comprise endohedral fullerene material, for example, such that the fullerene material encapsulates transition metals, carbides, or oxides.

The fullerene material may be dispersed in the film, for example, so that the fullerene material is evenly dispersed throughout the film. Alternatively, one or more layers of the film may comprise the fullerene material (e.g., dispersed in one or more layers of the film), while one or more other layers of the film may be substantially devoid of fullerene material. For example, a barrier layer of the film (discussed below) may comprise fullerene material, or a barrier layer may be substantially devoid of the fullerene material. The film may include one or two layers comprising the fullerene material directly adhered to a barrier layer.

The film or a layer of the film (e.g., a barrier layer of the film) may comprise at least about any of the following amounts of fullerene material: 0.001%, 0.005%, 0.01%, 0.05%, 0.1%, 0.5%, 1%, 1.5%, 2%, 2.5%, 3%, 4%, 5%, 8%, 10%, 12%, 15%, 20%, 25%, 30%, 35%, and 40% based on the weight of the film or the weight of a layer incorporating the fullerene material. The film or a layer of the film (e.g., a barrier layer) may comprise at most about any of the following amounts of fullerene material: 50%, 40%, 30%, 20%, 15%, 10%, 8%, 6%, 5%, 4%, 3%, 2%, 1%, 0.5%, 0.1%, 0.05%, and 0.01% based on the weight of the film or the weight of the layer.

In one embodiment, packaging film 10 (FIG. 1), which comprises outer layer 12 and one or more other layers 14, may comprise fullerene material by incorporating fullerene material in one or more selected regions of the film, such as one or more discontinuous regions 16 supported by the outer layer 12 of film 10, in which case the one or more discontinuous regions 16 may form at least a portion of the outer surface 18 of film 10.

Figure 2:
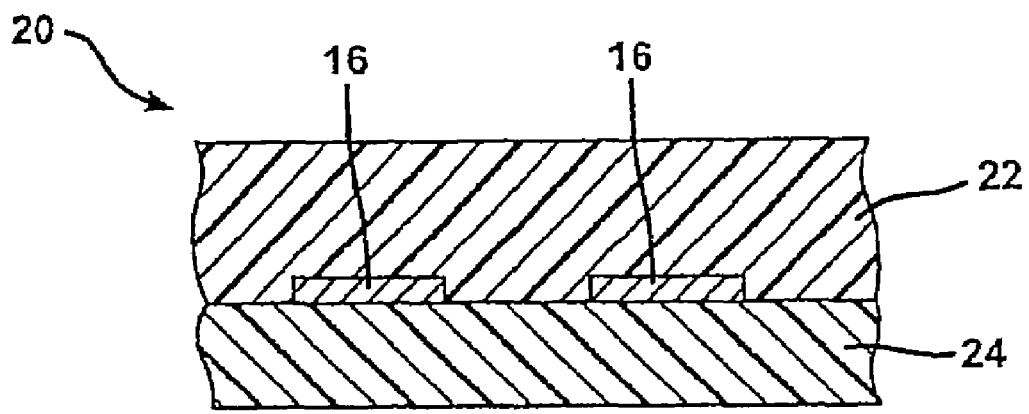
FIG. 2 is a representational cross-section of a packaging film of another embodiment of the invention.

In another embodiment, packaging film 20 (FIG. 2), which comprises one or more layers 22 and one or more other layers 24, may comprise fullerene material by incorporating fullerene material in one or more selected regions of the film, such as one or more discontinuous regions 16 internal to the film structure (e.g., between layers 22 and 24).

In either embodiment, the one or more discontinuous regions 16 may comprise any of the percentages of fullerene material mentioned in the previous paragraph (but in relation to the weight of the one or more discontinuous regions). The one or more discontinuous regions 16 may comprise polymer (e.g., thermoplastic polymer), such as one or more of any of the polymers described in this application in any of the percentage amounts described in this application (but in relation to the weight of the one or more discontinuous regions). The one or more discontinuous regions 16 may comprise one or more printing inks or varnishes.

The one or more discontinuous regions 16 may be in the shape of a dot, a strip, or other arrangement to form a desired area shape on the surface 18 of the film outer layer 12. The one or more discontinuous regions 16 may be deposited onto the film outer layer, for example, by "printing" (i.e., using a print application method) to apply a mixture comprising polymer resin and fullerene material onto the film outer layer in one or more selected regions. Useful printing methods for applying the mixture include one or more of printing methods known to those of skill in the art, such as screen, gravure, flexographic, roll, metering rod coating, ink-jet, digital, and toner print techniques.

Discontinuous regions 16 that have been deposited on an outer layer may subsequently become internal to the film structure by laminating or otherwise depositing one or more additional film layers over the discontinuous regions that incorporate fullerene material. For example, just as a printed image may be "trap printed" by laminating a film over the printed image, so too can discontinuous regions 16 be trapped by an outer film layer.

The discontinuous regions 16 incorporating fullerene material may take the form of one or more bands (e.g., "stripes" or "lanes") of polymeric resin, as described in U.S. Pat. No. 5,110,530 to Havens, which is incorporated herein in its entirety by reference. Such bands may incorporate the dispersed fullerene rather than or in addition to pigment. Such bands may also be internal or external to the film layer structure.

The packaging film may comprise at least about any of the following amounts of fullerene material: 0.001, 0.005, 0.01, 0.05, 0.1, 0.5, 1, 1.5, 2, 2.5, 3, 4, 5, 8, 10, 12, 15, 20, 25, 30, 35, and 40 weight parts fullerene material per 100 weight parts barrier polymer in the film. The film may comprise at most about any of the following amounts of fullerene material: 50, 40, 30, 20, 15, 10, 8, 6, 5, 4, 3, 2, 1, 0.5, 0.1, 0.05, and 0.01 weight parts fullerene material per 100 weight parts barrier polymer in the film. The forgoing weight ratios of this paragraph may also apply as the weight part of fullerene material to 100 weight parts of one or more of any particular barrier polymers identified below.

A layer of the film (e.g., a barrier layer as discussed below) may comprise at least about any of the following amounts of fullerene material based on the total amount of fullerene material in the packaging film: 50, 60, 70, 80, 90, 95, 99 weight %. A layer of the film comprising any of the foregoing amounts of fullerene material may also have a thickness of at most about any of the following percentages based on the total thickness of the packaging film: 50, 40, 30, 20, 15, 10, and 5%.

A barrier layer (discussed below) and/or a layer comprising fullerene material may be an outer layer of the film. An outer layer may be an "outside layer" of the film (i.e., an outer layer adapted or designed to face to the outside of a package incorporating the film) or an "inside layer" of the film (i.e., an outer layer adapted or designed to face the inside of a package incorporating the film). If the film comprises only one layer, then the one layer may be considered an "outer layer." A barrier layer and/or a layer comprising fullerene material may be an inner or interior layer of the film. An inner or interior layer of the film is between two outer layers of the film.

Barrier Polymers

The packaging film may comprise one or more barrier polymers. A "barrier polymer" is a polymer that may markedly decrease the transmission rate of a specified gas through a film incorporating the polymer, relative to a comparable film not incorporating the polymer. Thus, the barrier polymer for a specified gas imparts enhanced barrier attributes to the film relative to the specified gas. When the term "barrier polymer" is used in this application without reference to a specified gas, it is understood that the term may be in reference to any of water vapor, oxygen, and/or carbon dioxide gases.

For example, an "oxygen barrier polymer" may markedly decrease the oxygen gas transmission rate through a film incorporating the oxygen barrier polymer, because the oxygen barrier polymer imparts enhanced oxygen barrier attributes to the film. If the barrier polymer is effective for carbon dioxide, then the polymer may be considered a "carbon dioxide barrier polymer." If the barrier polymer is effective for water vapor, then the barrier polymer may be considered a "water vapor barrier polymer." A barrier polymer that is effective as a barrier for one type of gas may also be effective as a barrier to one or more other gases. For example, a barrier polymer that is effective for oxygen may also be effective for carbon dioxide, such that the same polymer may be considered an oxygen barrier polymer and a carbon dioxide barrier polymer.

If the packaging film is multilayered, then the one or more layers of the film that incorporate one or more barrier polymers in an amount sufficient to notably decrease the transmission rate of a specified gas through the film may be considered "barrier layers" with respect to the specified gas. If the film is monolayer and incorporates one or more barrier polymers, then the monolayer film itself may be considered a "barrier layer." For example, if a layer comprises an oxygen barrier polymer, then the layer may be considered an oxygen barrier layer.

The film or a barrier layer of the film may comprise one or more barrier polymers in an amount of at least about any of the following: 50%, 60%, 70%, 80%, 90%, 95%, 97%, 98%, 99%, and 99.5%, based on the weight of the film or the barrier layer, respectively.

The film or a barrier layer may comprise more than one barrier polymer such as a blend of barrier polymers, for example, two barrier polymers, at least two barrier polymers, three barrier polymers, and at least three barrier polymers. The film or a barrier layer may comprise a first barrier polymer in any of the following amounts (based on the weight of the film or barrier layer): at least about 40%, at least about 50%, at least about 60%, at least about 70%, at least about 80%, at least about 90%, at least about 95%, and the ranges between any of these forgoing values (e.g., from about 60 to about 80%). The film or a barrier layer may comprise a second barrier polymer in any of the following amounts (based on the weight of the film or barrier layer): less than about 60%, less than about 50%, less than about 40%, less than about 30%, less than about 20%, less than about 10%, and less than about 5%, and the ranges between any of these forgoing values (e.g., from about 20 to about 40%). The film or a barrier layer may comprise a third barrier polymer in any of the following amounts (based on the weight of the film or barrier layer): less than about 60%, less than about 50%, less than about 40%, less than about 30%, less than about 20%, less than about 10%, and less than about 5%, and the ranges between any of these forgoing values (e.g., from about 20 to about 40%).

A layer of the packaging film may comprise at least about any of the following amounts of a barrier polymer (e.g., oxygen, carbon dioxide, or water vapor barrier polymer) based on the total amount of that class of barrier polymer (e.g., oxygen, carbon dioxide, or water vapor barrier polymer) in the packaging film: 50, 60, 70, 80, 90, 95, and 99 weight %.

A barrier layer may have a thickness of at least about any of the following: 0.05 mils, 0.1 mils, 0.2 mils, 0.25 mils, 0.3 mils, 0.35 mils, 0.4 mils, 0.45 mils, 0.5 mils, 0.6 mils, 0.75 mils, 0.8 mils, 0.9 mils, 1 mil, 1.2 mils, 1.4 mils, and 1.5 mils. A barrier layer may have a thickness of less than about any of the following: 5 mils, 4 mils, 3 mils, 2 mils, 1.5 mils, 1.2 mils, and 1 mils.

Exemplary oxygen barrier polymers include: ethylene/vinyl alcohol copolymer ("EVOH"), polyvinyl alcohol ("PVOH"), vinylidene chloride polymers ("PVdC"), polyalkylene carbonate, polyester (e.g., PET, PEN), polyacrylonitrile ("PAN"), and polyamide.

EVOH

Useful ethylene/vinyl alcohol copolymer ("EVOH") may have an ethylene content of about 32%, or at least about any of the following values: 20%, 25%, and 30% by weight. EVOH may have an ethylene content of at most about any of the following values: 40%, 35%, and 33% by weight. EVOH may include saponified or hydrolyzed ethylene/vinyl acetate copolymers, such as those having a degree of hydrolysis of at least about any of the following values: 50% and 85%.

PVdC

Vinylidene chloride polymer ("PVdC") refers to a vinylidene chloride-containing polymer or copolymer—that is, a polymer that includes monomer units derived from vinylidene chloride ($CH_2=CCl_2$) and also, optionally, monomer units derived from one or more of vinyl chloride, styrene, vinyl acetate, acrylonitrile, and $C_1$-$C_{12}$ alkyl esters of (meth) acrylic acid (e.g., methyl acrylate, butyl acrylate, methyl methacrylate). As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VDC/VC"), vinylidene chloride/methyl acrylate copolymer, vinylidene chloride/ethyl acrylate copolymer, vinylidene chloride/ethyl methacrylate copolymer, vinylidene chloride/methyl methacrylate copolymer, vinylidene chloride/butyl acrylate copolymer, vinylidene chloride/styrene copolymer, vinylidene chloride/acrylonitrile copolymer, and vinylidene chloride/vinyl acetate copolymer.

Useful PVdC includes that having at least about 75, at most about 95, and at most about 98 weight % vinylidene chloride monomer. Useful PVdC (for example, as applied by latex emulsion coating) includes that having at least about any of 5%, 10%, and 15%—and/or at most about any of 25%, 22%, 20%, and 15 weight %—comonomer with the vinylidene chloride monomer.

Useful PVdC includes that having a weight-average molecular weight ($M_w$) of at least about any of the following 10,000; 50,000; 80,000; 90,000; 100,000; 111,000; 120,000;

150,000; and 180,000; and at most about any of the following: 180,000, 170,000; 160,000; 150,000; 140,000; 100,000; and 50,000. Useful PVdC also includes that having a viscosity-average molecular weight ($M_z$) of at least about any of the following: 130,000; 150,000; 170,000; 200,000; 250,000; and 300,000; and at most about any of the following: 300,000; 270,000; 250,000; and 240,000.

A oxygen barrier layer that includes PVdC may also include a thermal stabilizer (e.g., a hydrogen chloride scavenger such as epoxidized soybean oil) and a lubricating processing aid (e.g., one or more acrylates).

Polyamide

Useful polyamides may include those of the type that may be formed by the polycondensation of one or more diamines with one or more diacids and/or of the type that may be formed by the polycondensation of one or more amino acids. Useful polyamides include aliphatic polyamides and aliphatic/aromatic polyamides.

Representative aliphatic diamines for making polyamides include those having the formula:

where n has an integer value of 1 to 16. Representative examples include trimethylenediamine, tetramethylenediamine, pentamethylenediamine, hexamethylenediamine, octamethylenediamine, decamethylenediamine, dodecamethylenediamine, hexadecamethylenediamine. Representative aromatic diamines include p-phenylenediamine, 4,4'-diaminodiphenyl ether, 4,4' diaminodiphenyl sulphone, 4,4'-diaminodiphenylethane. Representative alkylated diamines include 2,2-dimethylpentamethylenediamine, 2,2,4-trimethylhexamethylenediamine, and 2,4,4 trimethylpentamethylenediamine. Representative cycloaliphatic diamines include diaminodicyclohexylmethane. Other useful diamines include heptamethylenediamine, nonamethylenediamine, and the like.

Representative diacids for making polyamides include dicarboxylic acids, which may be represented by the general formula:

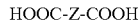

where Z is representative of a divalent aliphatic or cyclic radical containing at least 2 carbon atoms. Representative examples include aliphatic dicarboxylic acids, such as adipic acid, sebacic acid, octadecanedioic acid, pimelic acid, suberic acid, azelaic acid, dodecanedioic acid, and glutaric acid; and aromatic dicarboxylic acids, such as such as isophthalic acid and terephthalic acid.

The polycondensation reaction product of one or more or the above diamines with one or more of the above diacids may form useful polyamides. Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4,I"), polyhexamethylene isophthalamide ("nylon-6,I"), polyhexamethylene terephthalamide ("nylon-6,T"), poly (2,2,2-trimethyl hexamethylene terephthalamide), poly(m-xylylene adipamide) ("nylon-MXD,6"), poly(p-xylylene adipamide), poly(hexamethylene terephthalamide), poly(dodecamethylene terephthalamide), and polyamide-MXD,I.

Representative polyamides of the type that may be formed by the polycondensation of one or more amino acids include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly (10-aminodecanoic acid) ("nylon-10"), poly(11-aminoundecanoic acid) ("nylon-11"), and poly(12-aminododecanoic acid) ("nylon-12").

Representative copolyamides include copolymers based on a combination of the monomers used to make any of the foregoing polyamides, such as, nylon-4/6, nylon-6/6, nylon-6/9, nylon-6/12, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethylene-azelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6,T/6,I, nylon-6/MXD,T/MXD,I, nylon-6,6/6,10, and nylon-6,I/6,T.

Conventional nomenclature typically lists the major constituent of a copolymer before the slash ("/") in the name of a copolymer; however, in this application the constituent listed before the slash is not necessarily the major constituent unless specifically identified as such. For example, unless the application specifically notes to the contrary, "nylon-6/6,6" and "nylon-6,6/6" may be considered as referring to the same type of copolyamide.

Polyamide copolymers may include the most prevalent polymer unit in the copolymer (e.g., hexamethylene adipamide as a polymer unit in the copolymer nylon-6,6/6) in mole percentages ranging from any of the following: at least about 50%, at least about 60%, at least about 70%, at least about 80%, and at least about 90%, and the ranges between any of the forgoing values (e.g., from about 60 to about 80%); and may include the second most prevalent polymer unit in the copolymer (e.g., caprolactam as a polymer unit in the copolymer nylon-6,6/6) in mole percentages ranging from any of the following: less than about 50%, less than about 40%, less than about 30%, less than about 20%, less than about 10%, and the ranges between any of the forgoing values (e.g., from about 20 to about 40%).

Useful polyamides include those that are approved by the controlling regulating agency (e.g., the U.S. Food and Drug Agency) for either direct contact with food and/or for use in a food packaging film, at the desired conditions of use.

Polyesters

Useful polyesters include those made by: 1) condensation of polyfunctional carboxylic acids with polyfunctional alcohols, 2) polycondensation of hydroxycarboxylic acid, and 3) polymerization of cyclic esters (e.g., lactone).

Exemplary polyfunctional carboxylic acids (and their derivatives such as anhydrides or simple esters like methyl esters) include aromatic dicarboxylic acids and derivatives (e.g., terephthalic acid, isophthalic acid, dimethyl terephthalate, dimethyl isophthalate) and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate). Useful dicarboxylic acids also include those discussed above in the polyamide section. As is known to those of skill in the art, polyesters may be produced using anhydrides and esters of polyfunctional carboxylic acids.

Exemplary polyfunctional alcohols include dihydric alcohols (and bisphenols) such as ethylene glycol, 1,2-propanediol, 1,3-propanediol, 1,3 butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, and bisphenol A.

Exemplary hydroxycarboxylic acids and lactones include 4-hydroxybenzoic acid, 6-hydroxy-2-naphthoic acid, pivalolactone, and caprolactone.

Useful polyesters include homopolymers and copolymers. These may be derived from one or more of the constituents discussed above. Exemplary polyesters include poly(ethylene terephthalate) ("PET"), poly(butylene terephthalate) ("PBT"), and poly(ethylene naphthalate) ("PEN"). If the polyester includes a mer unit derived from terephthalic acid, then such mer content (mole %) of the diacid of the polyester may be at least about any the following: 70, 75, 80, 85, 90, and 95%.

The polyester may be thermoplastic. The polyester (e.g., copolyester) of the film may be amorphous, or may be partially crystalline (semi-crystalline), such as with a crystallinity of at least about, or at most about, any of the following weight percentages: 10, 15, 20, 25, 30, 35, 40, and 50%.

Other Polymers

The packaging film may comprise one or more thermoplastic polymers, including polyolefins, polystyrenes, polyurethanes, and ionomers.

Useful polyolefins include ethylene homo- and co-polymers and propylene homo- and co-polymers. Ethylene homopolymers include high density polyethylene ("HDPE") and low density polyethylene ("LDPE"). Ethylene copolymers include ethylene/alpha-olefin copolymers ("EAOs"), ethylene/unsaturated ester copolymers, and ethylene/(meth) acrylic acid. ("Copolymer" as used in this application means a polymer derived from two or more types of monomers, and includes terpolymers, etc.)

EAOs are copolymers of ethylene and one or more alpha-olefins, the copolymer having ethylene as the majority mole-percentage content. The comonomer may include one or more $C_3$-$C_{20}$ α-olefins, one or more $C_4$-$C_{12}$ α-olefins, and one or more $C_4$-$C_8$ α-olefins. Useful α-olefins include 1-butene, 1-hexene, 1-octene, and mixtures thereof EAOs include one or more of the following: 1) medium density polyethylene ("MDPE"), for example having a density of from 0.926 to 0.940 g/cm3; 2) linear medium density polyethylene ("LMDPE"), for example having a density of from 0.926 to 0.940 g/cm3; 3) linear low density polyethylene ("LLDPE"), for example having a density of from 0.919 to 0.925 g/cm3; 4) very-low or ultra-low density polyethylene ("VLDPE" and "ULDPE"), for example having density below 0.915 g/cm3, and 5) homogeneous EAOs. Useful EAOs include those having a density of less than about any of the following: 0.925, 0.922, 0.92, 0.917, 0.915, 0.912, 0.91, 0.907, 0.905, 0.903, 0.9, and 0.898 grams/cubic centimeter. Unless otherwise indicated, all densities herein are measured according to ASTM D1505.

The polyethylene polymers may be either heterogeneous or homogeneous. As is known in the art, heterogeneous polymers have a relatively wide variation in molecular weight and composition distribution. Heterogeneous polymers may be prepared with, for example, conventional Ziegler-Natta catalysts.

On the other hand, homogeneous polymers are typically prepared using metallocene or other single-site catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the Exxon Chemical Company (Baytown, Tex.) under the EXACT trademark, linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Another useful ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl(meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl(meth)acrylate) comonomer content of the ethylene/unsaturated ester copolymer may range from about 6 to about 18 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, no greater than about 94 weight %, no greater than about 93 weight %, and no greater than about 92 weight %, based on the weight of the copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/(meth) acrylic acid, which is the copolymer of ethylene and acrylic acid, methacrylic acid, or both.

Useful propylene copolymer includes propylene/ethylene copolymers ("EPC"), which are copolymers of propylene and ethylene having a majority weight % content of propylene, such as those having an ethylene comonomer content of less than 10%, less than 6%, and at least about 2% by weight.

Ionomer is a copolymer of ethylene and an ethylenically unsaturated monocarboxylic acid having the carboxylic acid groups partially neutralized by a metal ion, such as sodium or zinc. Useful ionomers include those in which sufficient metal ion is present to neutralize from about 10% to about 60% of the acid groups in the ionomer. The carboxylic acid is preferably "(meth)acrylic acid"—which means acrylic acid and/ or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

Tie Layer

A tie layer (e.g., a second layer) is a layer directly adhered (i.e., directly adjacent) to first and third layers, and has the primary function of improving the adherence of the first layer to the third layer. For example, the film may include one or two tie layers directly adhered to a barrier layer and/or one or two tie layers directly adhered to a layer comprising fullerene material.

A tie layer may comprise fullerene material. Further, a tie layer may comprise one or more polymers having grafted polar groups so that the polymer is capable of enhanced bonding to polar polymers such as EVOH. Useful polymers for tie layers include ethylene/unsaturated acid copolymer, ethylene/unsaturated ester copolymer, anhydride-modified polyolefin, polyurethane, and mixtures thereof. Further exemplary polymers for tie layers include one or more of the polyamides previously discussed; ethylene/vinyl acetate copolymer having a vinyl acetate content of at least about any of the following: 3, 6, and 15 weight %; ethylene/methyl acrylate copolymer having a methyl acrylate content of at least about 20 weight %; anhydride-modified ethylene/methyl acrylate copolymer having a methyl acrylate content of at least about any of the following: 5, 10, 15, and 20 weight %; and anhydride-modified ethylene/alpha-olefin copolymer, such as an anhydride grafted LLDPE.

Modified polymers or anhydride-modified polymers include polymers prepared by copolymerizing an unsaturated carboxylic acid (e.g., maleic acid, fumaric acid), or a derivative such as the anhydride, ester, or metal salt of the unsaturated carboxylic acid with—or otherwise incorporating the same into—an olefin homopolymer or copolymer. Thus, anhydride-modified polymers have an anhydride functionality achieved by grafting or copolymerization.

Additional Layers of the Film

The film may include one or more layers in addition to the one or more barrier layers and/or the one or more layers comprising fullerene material. Such additional layers may include one or more tie layers, one or more heat seal layers, an outside layer, an inside layer, one or more abuse layers, and one or more bulk or core layers. Any of these layers may comprise fullerene material, or may be substantially devoid of fullerene material.

Below are some examples of combinations in which the alphabetical symbols designate the layers. Where the film representation below includes the same letter more than once, each occurrence of the letter may represent the same composition or a different composition within the class that performs a similar function. C/A/E, C/B/A/E, C/B/A/B/E, C/B/A/B/D/E, C/B/A, C/A, A/E, E/B/A, C/D/B/A, E/A/E, A/B/D/E, C/B/A/B/C, C/B/A/B/E, C/B/A/B/D/E, C/D/B/A/B/E, C/D/B/A/B/D/E, C/B/A/B/C, C/B/A/B/E, C/B/A/B/D/E, C/D/B/A/B/E, C/D/B/A/B/D/E "A" is a barrier layer, as discussed above.

"B" is a tie layer, as discussed above.

"C" is a heat seal layer (i.e., sealant layer), that is, a layer adapted to facilitate the heat-sealing of the film to itself or to another object, such as a substrate, as is known in the art.

"D" is a core or bulk layer.

"E" is an outside (i.e., abuse or print side) layer.

The C, D, and E layers may comprise one or more of any of the polyolefins, ionomers, polyamides, polyesters, polystyrenes, and polyurethanes described above. The amounts of any of these polymers may be at least about, or at most about, 50, 60, 70, 80, 90, and 95 weight % based either on the weight of the film or a layer of the film comprising the polymer.

Addititives

One or more layers of the film may include one or more additives useful in packaging films, such as, antiblocking agents, slip agents, antifog agents, colorants, pigments, dyes, flavorants, antimicrobial agents, meat preservatives, antioxidants, fillers, radiation stabilizers, and antistatic agents. Such additives, and their effective amounts, are known in the art.

Modulus of the Film

The packaging film preferably exhibits a Young's modulus sufficient to withstand the expected handling and use conditions. Young's modulus may be measured in accordance with one or more of the following ASTM procedures: D882; D5026-95a; D4065-89, each of which is incorporated herein in its entirety by reference. The packaging film may have a Young's modulus—measured either before and/or after the exposing step discussed below—of at least about and/or at most about any of the following: 10,000; 15,000; 25,000; 40,000; 70,000; 80,000; 90,000; 100,000; 150,000; 200,000; 250,000; 300,000; and 350,000 pounds/square inch, measured at a temperature of 73° F. Useful ranges for Young's modulus for the film include from about 10,000 to about 300,000 psi, from about 15,000 to about 150,000 psi, and from about 15,000 to about 70,000 psi, measured at a temperature of 212° F.

Appearance Characteristics of the Film

The packaging film may have low haze characteristics. Haze is a measurement of the transmitted light scattered more than 2.5° from the axis of the incident light. Haze is measured against the outside layer of the film. As previously discussed, the "outside layer" is the outer layer of the film that will be adjacent the area outside of the package comprising the film. Haze is measured according to the method of ASTM D 1003, which is incorporated herein in its entirety by reference. All references to "haze" values in this application are by this standard. The haze of the film—measured either before and/ or after the exposing step discussed below—may be no more than about any of the following values: 30%, 25%, 20%, 15%, 10%, 8%, 5%, and 3%.

The packaging film may have a gloss as measured against the outside layer—measured either before and/or after the exposing step discussed below—of at least about any of the following values: 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (60° angle), which is incorporated herein in its entirety by reference.

The packaging film may be transparent (at least in the non-printed regions) so that a packaged article may be visible through the film. "Transparent" means that the film transmits incident light with negligible scattering and little absorption, enabling objects (e.g., the packaged article or print) to be seen clearly through the film under typical viewing conditions (i.e., the expected use conditions of the material). The average transparency (i.e., clarity) of the film—measured either before and/or after the exposing step discussed below—may be at least about any of the following values: 65%, 70%, 75%, 80%, 85%, and 90%, as measured in accordance with ASTM D1746.

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993), of which pages 173-80 is incorporated herein by reference.

Film Orientation

The packaging film may be non-oriented. Alternatively, the film may be oriented in either the machine (i.e., longitudinal), the transverse direction, or in both directions (i.e., biaxially oriented), for example, to enhance the strength, optics, and durability of the film. The film may be oriented in at least one direction by any of the following ratios: at least 2.5:1, from about 2.7:1 to about 10:1, at least 2.8:1, at least 2.9:1, at least 3.0:1, at least 3.1:1, at least 3.2:1, at least 3.3:1, at least 3.4:1, at least 3.5:1, at least 3.6:1, and at least 3.7:1.

The packaging film may be non-heat shrinkable—for example, having a free shrink at 185° F. (85° C.) in each of the machine (longitudinal) and transverse directions of less than about any of the following: 3%, 1%, and 0.5%. Alternatively, the packaging film may be heat shrinkable, for example having a free shrink at 185° F. (85° C.) in either of the machine or transverse directions of at least about any of the following: 5%, 10%, 15%, 40%, 50%, 55%, 60%, and 65%. The free shrink at 185° F. (85° C.) in either of the machine or transverse directions may also range from about any of the following: 40 to 150%, 50 to 140%, and 60 to 130%. The film may have unequal free shrink in both directions, that is differing free shrink in the machine and transverse directions. The film may not have a heat shrink characteristic in both directions. The free shrink of the film is determined by measuring the percent dimensional change in a 10 cm×10 cm film specimen when subjected to selected heat (i.e., at a certain temperature exposure) according to ASTM D 2732, which is incorporated herein in its entirety by reference.

As is known in the art, a heat-shrinkable film shrinks upon the application of heat while the film is in an unrestrained state. If the film is restrained from shrinking—for example by a packaged product around which the film shrinks—then the tension of the heat-shrinkable film increases upon the application of heat. Accordingly, a heat-shrinkable film that has been exposed to heat so that at least a portion of the film is either reduced in size (unrestrained) or under increased tension (restrained) is considered a heat-shrunk (i.e., heat-contracted) film.

The packaging film may exhibit a shrink tension in at least one direction of any of the following: at least 100 psi, 175 psi, from about 175 to about 500 psi, from about 200 to about 500 psi, from about 225 to about 500 psi, from about 250 to about 500 psi, from about 275 to about 500 psi, from about 300 to about 500 psi, and from about 325 to about 500 psi. Shrink tension is measured at 185° F. (85° C.) in accordance with ASTM D 2838, which is incorporated herein in its entirety by reference. The shrink tension of the film should be low enough for a given end use and film construction so as not to induce an undesired or premature seal failure or delamination.

The packaging film may be annealed or heat-set to reduce the free shrink either slightly, substantially, or completely, or the film may not be heat set or annealed once stretched in order that the film will have a high level of heat shrinkability.

Manufacturing the Film

The packaging film may be manufactured by thermoplastic film-forming processes known in the art. The film may be prepared by extrusion or coextrusion utilizing, for example, a tubular trapped bubble film process or a flat film (i.e., cast film or slit die) process. The packaging film may also be prepared by applying one or more layers by extrusion coating, adhesive lamination, extrusion lamination, solvent-borne coating, or by latex coating (e.g., spread out and dried on a substrate). A combination of these processes may also be employed. These processes are known to those of skill in the art.

In forming the resin mixture for the one or more film layers that comprise the fullerene material, the fullerene material may be mixed with polymer before the resin mixture is heated or melted for processing to form the film. This may help to disperse the fullerene material in the polymer. Once mixed, the blend can be extruded and processed as discussed above.

Optional Energy Treatment

One or more of the thermoplastic layers of the film—or at least a portion of the entire film—may be cross-linked, for example, to improve the strength of the film. Cross-linking may be achieved by using chemical additives or by subjecting one or more film layers to one or more energetic radiation treatments—such as ultraviolet, X-ray, gamma ray, beta ray, and high energy electron beam treatment—to induce cross-linking between molecules of the irradiated material. Useful radiation dosages include at least about any of the following: 5, 7, 10, 15, 20, 25, 30, 35, 40, 45, and 50 kGy (kiloGray). Useful radiation dosages include less than about any of the following: 150, 130, 120, 110, 100, 90, 80, and 70 kGy. The dosage of the radiation utilized for crosslinking may be achieved by a sufficiently low intensity or over a sufficiently long duration such that the fullerene material is not significantly structurally disrupted (and the OTR of the film is not substantially affected).

It may be desirable to avoid irradiating a film layer comprising PVdC or a film layer comprising fullerene. To that end, substrate layers may be extruded and irradiated, and the PVdC-containing layer and/or the fullerene-containing layer (and subsequent layers) may then be applied to the irradiated substrate, for example, by an extrusion coating process.

All or a portion of one or two surfaces the film may be corona and/or plasma treated to change the surface energy of the film, for example, to increase the ability of print or a food product to adhere to the film. One type of oxidative surface treatment involves bringing the sealant film into the proximity of an $O_2$— or $N_2$-containing gas (e.g., ambient air) which has been ionized. Exemplary techniques are described in, for example, U.S. Pat. No. 4,120,716 (Bonet) and U.S. Pat. No. 4,879,430 (Hoffman), which are incorporated herein in their entirety by reference. The packaging film may be treated to have a surface energy of at least about 0.034 J/m$^2$, preferably at least about 0.036 J/m$^2$, more preferably at least about 0.038 J/m$^2$, and most preferably at least about 0.040 J/m$^2$.

Increasing the Gas Transmission Rate of the Packaging Film

The gas transmission rate of the packaging film comprising fullerene material may be increased by exposing the packaging film to an effective amount of radiation energy.

The effective amount of radiation energy may comprise, consist of, or consist essentially of one or more of any of the following: 1) non-ionizing radiation, such as visible light, infrared light, ultraviolet light (e.g., UVA, UVB, and/or UVC), microwave, and radiowave, and 2) ionizing radiation, such as electron beam irradiation, x-ray irradiation, gamma-ray irradiation, beta-ray irradiation, and terahertz radiation. The effective amount of radiation energy may comprise at least about any of the following amounts—20%, 30%, 40%, 50%, 60%, 70%, 80%, 90%, and 95%—of any one, or any combination of one or more, of the types of radiation energy previously listed. For example, the effective amount of radiation energy may comprise at least about 50% non-ionizing energy; the effective amount of non-ionizing radiation energy may comprise at least about 50% visible light energy; or the effective amount of ionizing radiation may comprise at least about 60% electron beam radiation energy.

The radiation energy amount (e.g., the surface dosage for non-ionizing radiation or the absorbed dosage for ionizing radiation) of the exposing step may be delivered within a duration of at most about any of the following: 30, 25, 20, 15, 10, 9, 8, 7, 6, 5, 4, 3, 2, 1, 0.5, 0.1, 0.05, 0.01, 0.005, and 0.001 seconds; and 500, 150, 130, 110, 100, 90, 80, 70, 60, and 50 microseconds. The radiation energy amount (e.g., the surface dosage or the absorbed dosage) of the exposing step may be delivered within a duration of at least about any of the following: 10, 20, 30, 40, 50, 60, 70, 80, 90, 100, 150, and 500 microseconds; and 0.001, 0.005, 0.01, 0.05, 0.1, 0.5, 1, 2, 3, 4, 5, 6, 7, 8, 9, 10, 15, 20, and 25 seconds. The delivery of the radiation amount may be substantially continuous during the duration time period, or may occur in a discontinuous manner over the duration time period, for example by any of at least one, at least two, at least three, and at least four pulses of radiation, such as a series of pulses of radiation.

If multiple pulses of radiation are used, then it may be beneficial for the intervals between the pulses of radiation energy to be short enough so that the multiple pulses may have cumulative effect. An individual pulse of radiation may have a duration of at least about any of the following values: 10, 20, 30, 40, 50, 60, 70, 80, 90, 100, 200, 300, 400, and 500 microseconds. An individual pulse of radiation may have a duration of at most about any of the following values: 900, 700, 500, 300, 150, 130, 110, 100, 90, 80, 70, 60, and 50 microseconds.

The duration discussed above may also be considered a residence time for a portion of the packaging film that is in the exposure zone of a radiation delivery device, for example, where the packaging film is in the form of a continuous web that travels beneath a radiation delivery device, which may be continuously irradiating that portion of the web that travels through the radiation exposure zone.

For non-ionizing radiation, the effective amount of radiation energy to increase the gas transmission rate of the film may be considered a function of the radiation intensity (i.e., the rate of radiation energy flow per unit area) and the duration of the radiation exposure, to achieve an effective surface dose (i.e., the radiation energy per unit area at the surface of the packaging film). The relationship between these factors may be illustrated by the following equation: (intensity)×(duration)=surface dose.

The radiation energy exposure step may comprise a non-ionizing radiation intensity (measured at the surface of the packaging film) of at least about any of the following: 10, 30, 50, 80, 100, 150, 200, 250, 300, 400, 500, 800, 1,000, 1,200, 1,500, and 1,800 mW/cm2; and at most about any of the following: 100,000, 10,000, 2,000, 1,800, 1,500, 1,200, 1,000, 800, 500, 450, 400, 350, 300, 250, 200, 150, and 100 mW/cm2. Any of these intensities may occur during one or more pulses of radiation, if the radiation energy is delivered in a discontinuous manner.

Effective amounts of non-ionizing radiation energy (measured at the surface of the packaging film) of the exposing step delivered during any of the durations discussed above may include at least about any of the following surface doses: 0.01, 0.05, 0.1, 0.5, 1, 5, 10, 20, 50, 100, 500, 1,000, 5,000, 10,000, 20,000, and 100,000 mJ/cm2 (i.e., milli-Joules/cm2); and may include at most about any of the following surface doses: 0.05, 0.1, 0.5, 1, 5, 10, 20, 50, 100, 500, 1,000, 5,000, 10,000, 20,000, 50,000, 60,000, 100,000, and 1,000,000 mJ/cm2.

The effective amount of radiation energy may be substantially devoid of microwave energy in the 2.54 GHz frequency range (12 cm wavelength) in order to avoid exciting (heating) water or water-bearing product (e.g., food) that may be enclosed in a package comprising the film.

With respect to non-ionizing radiation, the radiation intensity may be measured at the surface of the packaging film utilizing the types of detectors, filters, and radiometers that are correctly calibrated and appropriate for the wavelength ranges of the radiation being measured, as is known to those of skill in the art. See, for example, A. Ryer, "Light Measurement Handbook" (1998, International Light, Inc., Newburyport, Mass.), which is incorporated herein in its entirety by reference. For example, a silicon detector type may be useful for measuring the radiation intensity for radiation wavelengths of from about 250 to about 1050 mn, in conjunction with a radiometer such as the IL 1700 (International Light Inc.).

As is also known to those of skill in the art, if a broad range of non-ionizing radiation wavelengths contribute to the radiation being measured, then one or more filters may be used to reduce or eliminate the radiation wavelengths for which a particular detector type is not appropriate or optimum, and the previously filtered radiation wavelength ranges may be subsequently measured with an appropriate detector while filtering the previously measured radiation wavelengths. The total radiation intensity may be calculated by summing the radiation intensities of the separate measurements of different wavelength ranges.

With respect to ionizing radiation, the effective amount of radiation energy to increase the gas transmission rate of the film may be characterized as an absorbed dose, which is the amount of energy deposited by ionizing radiation in the packaging film. A common unit of absorbed dose is the kiloGray (kGy), where 1 kGy=1 kJ of energy absorbed per kilogram of matter, in this case either per kg of the packaging film comprising fullerene material or per kg of a film layer comprising fullerene material, whichever is specified.

Effective amounts of ionizing radiation energy of the exposing step delivered either to the packaging film comprising fullerene material or to the film layer comprising fullerene material, during any of the durations discussed above, may include at least about any of the following absorbed doses: 0.1, 0.5, 1, 2, 5, 10, 15, 20, 30, 50, 100, 200, and 1,000 kGy; and may include at most about any of the following absorbed doses: 0.5, 1, 2, 5, 10, 15, 20, 30, 50, 100, 200, 300, 1,000, and 2,000 kGy. Any of these absorbed dosages may occur during one or more pulses of radiation, if the radiation energy is delivered in a discontinuous manner.

With respect to ionizing radiation, the radiation absorbed dose may be measured utilizing one or more dosimeters and dosimetry techniques that are appropriate for measuring the types and amounts of ionizing radiation energy absorbed by the packaging material incorporating fullerene material or absorbed by the film layer comprising fullerene material, as may be specified. Such dosimeters, dosimetry techniques, and the appropriate calibration methods are known to those of skill in the art. See, for example, ASTM E1261-00 "Standard Guide for Selection and Calibration of Dosimetry Systems for Radiation Processing," which is incorporated herein in its entirety by reference, together with the ASTM standards and reports referenced therein, each of which is incorporated herein in its entirety by reference. See also, as appropriate, the following standard guides and practices from ASTM: E666, E668, E1026, E1204, E1205, E1275, E1276, E1310, E1400, E1401, E1431, E1538, E1539, E1540, E1607, E1608, E1631, E1649, E1650, E1702, E1707, E1818, and E1956, each of which is incorporated herein in its entirety by reference. Additional references include W. L. McLaughlin, "The Measurement of Absorbed Dose and Dose Gradients," Radiat. Phys. Chem. Vol. 15, pp. 9-38 (1980) and W. L. McLaughlin et al, "Dosimetry Systems for Radiation Processing," Radiat. Phys. Chem. Vol. 46, No. 4-6, pp. 1163-74 (1995). As is also known to those of skill in the art, the National Institute of Standards and Technology (NIST) Agency of the U.S. Commerce Department's Technology Administration, 100 Bureau Drive, Stop 8460, Gaithersburg, Md. 20899-8460, provides useful calibration services for ionizing radiation dosimetry.

The effective amount of radiation energy of the exposing step may be sufficient to structurally disrupt at least a portion of the fullerene material in the exposed packaging film. The term "structurally disrupt" means structurally or chemically deconstruct or reconstruct (e.g., transform) into another structure or other structures, as for example, by ignition, liberation of adsorbed gas or liquid, burning, thermal energy exposure, temperature increase, or rapid rate of energy conversion. The radiation exposure step may structurally disrupt at least about any of the following amounts of fullerene material present in the packaging film: 20, 50, 60, 70, 80, 90, 95, 99, and 100 weight %.

The effective amount of radiation energy of the exposing step may be sufficient to result in the perforation (e.g., with a plurality of apertures) of the packaging film or of one or more layers of the packaging film. It is believed that the radiation energy may cause a rapid heating of the fullerene material, which transfers heat to at least a portion of the packaging film polymer in the vicinity of the fullerene material. Such heat may be generated with sufficient quantity and speed that at least a portion of such polymer may be structurally disrupted, resulting in deconstructed structures that may tend to be liberated from the film or film layer, resulting in the film or one or more film layers being perforated.

After the radiation energy exposing step, the packaging film or any of the particular layers of the packaging film may be perforated or may be unperforated. The exposed packaging film may have any of the gas transmission rates discussed in this application either while the film or one or more layers of the film are perforated or while the film or one or more film layers are unperforated.

Useful equipment, machines, and methods for providing the various types of radiation energy discussed above are known to those of skill in the art, and are therefore not discussed in detail here. For example, the radiation energy may be provided by a photoflash, a flashlamp (e.g., pulsed, gas-filled flashlamps), and spark-gap discharge apparatus. The radiation energy may also be provided by a pulsed lamp system such as those available from Xenon Corp. (Woburn, Mass.) (e.g., model RC-740, dual lamp and model RC-747 pulsating xenon light) and Maxwell Laboratories, Inc. (e.g., Flashblast Model FB-100 pulsed light system), and those described in U.S. Pat. Nos. 5,034,235 and 6,449,923.

Oxygen Transmission

The packaging film may have an "initial" oxygen transmission rate, that is, the oxygen transmission rate before the radiation energy exposure step, of at most about any of the following values: 1,000, 500, 400, 300, 200, 150, 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985. (A reference to the gas transmission attributes of a film that is a component of a laminate refers to the gas transmission attributes of the film itself, which can be measured by separating the film from the laminate—for example, by using an appropriate solvent to dissolve the adhesive that bonds films together to form a laminate.)

The packaging film may have an oxygen transmission rate after the radiation energy exposure step that is higher than the oxygen transmission rate of the packaging film immediately before the radiation exposure step by at least about any of the following values: 100; 500; 1,000; 3,000; 5,000; 8,000; 10,000; 15,000; 20,000; 25,000; 30,000; 35,000; 40,000; 50,000; 100,000; 200,000; 400,000; 800,000; and 1,000,000 cubic centimeters (at standard temperature and pressure) per square meter per day per 1 atmosphere of oxygen pressure differential measured at 0% relative humidity and 23° C. The packaging film may have an oxygen transmission rate after the radiation exposure step that is higher than the oxygen transmission rate of the packaging film immediately before the radiation exposure step by at most about any of the following values: 3,000; 5,000; 8,000; 10,000; 15,000; 20,000; 25,000; 30,000; 35,000; 40,000; 50,000; 60,000; 70,000; 90,000; 110,000; 200,000; and 400,000 cubic centimeters (at standard temperature and pressure) per square meter per day per 1 atmosphere of oxygen pressure differential measured at 0% relative humidity and 23° C.

The packaging film after the radiation energy exposure step may have an oxygen transmission rate of at least about any of the following values: 100; 500; 1,000; 3,000; 5,000; 8,000; 10,000; 15,000; 20,000; 25,000; 30,000; 35,000; 40,000; 50,000; 100,000; 200,000; 400,000; 800,000; and 1,000,000 cubic centimeters (at standard temperature and pressure) per square meter per day per 1 atmosphere of oxygen pressure differential measured at 0% relative humidity and 23° C. The packaging film may have an after the radiation energy exposure step may have an oxygen transmission rate after the radiation of at most about any of the following values: 3,000; 5,000; 8,000; 10,000; 15,000; 20,000; 25,000; 30,000; 35,000; 40,000; 50,000; 60,000; 70,000; 90,000; 110,000; 200,000; and 400,000 cubic centimeters (at standard temperature and pressure) per square., meter per day per 1 atmosphere of oxygen pressure differential measured at 0% relative humidity and 23° C.

Carbon Dioxide Transmission

The packaging film may have an "initial" carbon dioxide transmission rate, that is, the carbon dioxide transmission rate before the radiation energy exposure step, of at most about any of the following values: 4,000, 2,000, 1,000, 500, 400, 300, 200, 150, 100, 50, 45, 40, 35, 30, 25, 20, 15, 10, and 5 cubic centimeters (at standard temperature and pressure) per square meter per day per 1 atmosphere of carbon dioxide pressure differential measured at 0% relative humidity and 23° C. All references to carbon dioxide transmission rate in this application are measured at these conditions using methodology analogous to ASTM D-3985, adapted for carbon dioxide rather than oxygen.

The packaging film may have a carbon dioxide transmission rate after the radiation energy exposure step that is higher than the carbon dioxide transmission rate of the packaging film immediately before the radiation exposure step by at least about any of the following values: 100; 500; 1,000; 3,000; 5,000; 8,000; 10,000; 15,000; 20,000; 25,000; 30,000; 35,000; 40,000; 50,000; 100,000; 200,000; 400,000; 800,000; and 1,000,000 cubic centimeters (at standard temperature and pressure) per square meter per day per 1 atmosphere of carbon dioxide pressure differential measured at 0% relative humidity and 23° C. The packaging film may have a carbon dioxide transmission rate after the radiation exposure step that is higher than the carbon dioxide transmission rate of the packaging film immediately before the radiation exposure step by at most about any of the following values: 3,000; 5,000; 8,000; 10,000; 15,000; 20,000; 25,000; 30,000; 35,000; 40,000; 50,000; 60,000; 70,000; 90,000; 110,000; 200,000; and 400,000 cubic centimeters (at standard temperature and pressure) per square meter per day per 1 atmosphere of carbon dioxide pressure differential measured at 0% relative humidity and 23° C.

The packaging film after the radiation energy exposure step may have a carbon dioxide transmission rate of at least about any of the following values: 100; 500; 1,000; 3,000; 5,000; 8,000; 10,000; 15,000; 20,000; 25,000; 30,000; 35,000; 40,000; 50,000; 100,000; 200,000; 400,000; 800,000; and 1,000,000 cubic centimeters (at standard temperature and pressure) per square meter per day per 1 atmosphere of carbon dioxide pressure differential measured at 0% relative humidity and 23° C. The packaging film after the radiation energy exposure step may have a carbon dioxide transmission rate of at most about any of the following values: 3,000; 5,000; 8,000; 10,000; 15,000; 20,000; 25,000; 30,000; 35,000; 40,000; 50,000; 60,000; 70,000; 90,000; 110,000; 200,000; and 400,000 cubic centimeters (at standard temperature and pressure) per square meter per day per 1 atmosphere of carbon dioxide pressure differential measured at 0% relative humidity and 23° C.

Water Vapor Transmission

The packaging film may have an "initial" water vapor transmission rate, that is, the water vapor transmission rate before the radiation energy exposure step, of at most about any of the following values: 150, 100, 80, 60, 50, 40, 20, 15, 10, 5, 1, and 0.5 grams/100 in$^2$0.24 hours (100% humidity, 23° C.) measured according to ASTM F 1249-01 (for values at 20 grams or lower) and ASTM E 96 (for values above 20 grams). All references to water vapor transmission rate in this application are measured at these conditions.

The packaging film may have a water vapor transmission rate after the radiation energy exposure step that is higher than the water vapor transmission rate of the packaging film immediately before the radiation exposure step by at least about any of the following values: 500, 400, 300, 250, 200, 150, 100, 80, 60, 50, 40, 20, 15, 10, and 5 grams/100 in$^2$0.24 hours (100% humidity, 23° C.). The packaging film may have a water vapor transmission rate after the radiation exposure step that is higher than the water vapor transmission rate of the packaging film immediately before the radiation exposure step by at most about any of the following values: 1,000, 750, 500, 400, 300, 250, 200, 150, 100, 80, 60, 50, 40, 20, 15, and 10 grams/100 in$^2$0.24 hours (100% humidity, 73° F.).

The packaging film after the radiation energy exposure step may have a water vapor transmission rate of at least about any of the following values: 500, 400, 300, 250, 200, 150, 100, 80, 60, 50, 40, 20, 15, 10, and 5 grams/100 in$^2$0.24 hours (100% humidity, 23° C.). The packaging film after the radiation energy exposure step may have a water vapor transmission rate of at most about any of the following values: 10,000, 1,000, 750, 500, 400, 300, 250, 200, 150, 100, 80, 60, 50, 40, 20, 15, and 10. The packaging film after the radiation energy exposure step may have any of the above water vapor transmission rates while also not allowing the transmission of liquid water through the film.

Use of the Packaging Film

The packaging film may be used in or as part of packaging where it is useful for the enclosed interior space of the package to maintain a modified atmosphere for a desired initial time period, then to allow the enclosed interior space of the package to change (e.g., rapidly change) to an atmosphere approaching ambient air after the initial time period.

For example, the modified atmosphere of the interior space of the package may have a high oxygen, carbon dioxide, or nitrogen content relative to ambient air (e.g., at least about any of the following: 70, 80, 90, 95 volume % oxygen, carbon dioxide, or nitrogen) or a low oxygen content relative to ambient air (e.g., less than about any of 10, 5, 1, 0.5, and 0.05 volume % oxygen). After the desired initial time period, the packaging film of the package may be exposed to the effective amount of radiation energy discussed above to effect an increase in gas permeability of the packaging film. This may result in an increase in the exchange rate of transfer of gas from the interior space of the package (e.g., the modified atmosphere) through the exposed packaging film to the ambient atmosphere—and the transfer rate from the ambient atmosphere to the interior of the package, such that atmosphere of the interior space of the package may approach the gas concentrations of ambient air.

For example, red meat may be packaged within a low-oxygen modified atmosphere in the interior of a package incorporating the packaging film to extend the shelf life of the packaged fresh red meat. The fresh "red" meat packaged in the low-oxygen atmosphere may actually have a purple color. At a desired point (e.g., after the package arrives at a supermarket or other retail outlet), the packaging film of the package may be exposed to the effective amount of radiation energy to increase the permeability of the packaging film.

Oxygen from ambient air may transfer to the interior space of the package and cause the meat to "bloom" to a desired red color.

The packaging film may be incorporated into, formed into, or used as part of any of the following: bag, bottle, casing, container, laminate, lid, liner, pouch, receptacle, tray, tubes, formed or non-formed web, and wrap. For example, the packaging film may be used as a liner of a tray or as a lid sealed to a tray. A package comprising the packaging film may be used, for example, to package a liquid product, a solid product, and/or a food product (e.g., ground or processed meat products and fresh red meat products such as poultry, pork, beef, sausage, lamb, goat, horse, and fish.). Useful package configurations include end-seal bag, side-seal bag, L-seal bag, pouch, and seamed casing (e.g., back-seamed tubes by forming an overlap or fin-type seal).

Any numerical ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. The definitions and disclosures set forth in the present Application control over any inconsistent definitions and disclosures that may exist in an incorporated reference. Any reference to an item in the disclosure or to an element in the claim in the singular using the articles "a," "an," "the," or "said" is not to be construed as limiting the item or element to the singular unless expressly so stated. All references to ASTM tests are to the most recent, currently approved, and published version of the ASTM test identified, as of the priority filing date of this application. Each such published ASTM test method is incorporated herein in its entirety by this reference.

What is claimed is:

1. A method of increasing the gas transmission rate of a packaging film comprising the steps of:
    providing a packaging film comprising at least about 0.001 weight %, based on the weight of the film, of fullerene material selected from one or more of spherical fullerenes, bowl-shaped fullerenes, multi-walled carbon nanotubes, carbon nanocones, and carbon nano-onions; and
    exposing the packaging film to an amount of radiation energy effective to increase the oxygen transmission rate of the packaging film by at least about 100 cubic centimeters (at standard temperature and pressure) per square meter per day per 1 atmosphere of oxygen pressure differential measured at 0% relative humidity and 23° C.

2. The method of claim 1 wherein the radiation energy amount comprises a surface dose of non-ionizing radiation of at least about 0.01 mJ/cm2 that is delivered within a duration of at most about 30 seconds.

3. The method of claim 1 wherein the radiation energy amount comprises a surface dose of non-ionizing radiation of at least about 1 mJ/cm2 that is delivered within a duration of at most about 10 seconds.

4. The method of claim 1 wherein the radiation exposure step comprises a radiation intensity of non-ionizing radiation at the surface of the packaging film of at least about 10 mW/cm2.

5. The method of claim 1 wherein the radiation exposure step comprises a radiation intensity of non-ionizing radiation at the surface of the packaging film of at least about 50 mW/cm2.

6. The method of claim 1 wherein the radiation exposure step comprises a radiation intensity of non-ionizing radiation at the surface of the packaging film of at least about 100 mW/cm2.

7. The method of claim 1 wherein the radiation exposure step comprises a radiation intensity of non-ionizing radiation at the surface of the packaging film of at least about 500 mW/cm2.

8. The method of claim 1 wherein the radiation energy amount comprises an absorbed dose of ionizing radiation absorbed by the packaging film of at least about 0.1 kGy that is delivered within a duration of at most about 30 seconds.

9. The method of claim 1 wherein the radiation energy amount comprises an absorbed dose of ionizing radiation absorbed by the packaging film of at least about 10 kGy that is delivered within a duration of at most about 5 seconds.

10. The method of claim 1 wherein:
    the packaging film of the providing step comprises at least one layer comprising at least about 50% of the fullerene material by weight of the total amount of fullerene material in the packaging film; and
    the radiation energy amount comprises an absorbed dose of ionizing radiation absorbed by the at least one layer of at least about 0.1 kGy that is delivered within a duration of at most about 30 seconds.

11. The method of claim 1 wherein the packaging film of the providing step has an oxygen transmission rate of at most about 100 cubic centimeters (at standard temperature and pressure) per square meter per day per 1 atmosphere of oxygen pressure differential measured at 0% relative humidity and 23° C.

12. The method of claim 1 wherein the exposing step increases the oxygen transmission rate of the packaging film by at least about 1,000 cubic centimeters (at standard temperature and pressure) per square meter per day per 1 atmosphere of oxygen pressure differential measured at 0% relative humidity and 23° C.

13. The method of claim 1 wherein the exposing step increases the oxygen transmission rate of the packaging film by at least about 10,000 cubic centimeters (at standard temperature and pressure) per square meter per day per 1 atmosphere of oxygen pressure differential measured at 0% relative humidity and 23° C.

14. The method of claim 1 wherein the packaging film of the providing step comprises:
    100 weight parts oxygen barrier polymer selected from one or more of ethylene/vinyl alcohol copolymer, polyvinyl alcohol, vinylidene chloride polymer, polyalkylene carbonate, polyester, polyacrylonitrile, and polyamide; and at least about 0.001 weight parts of the fullerene material per 100 weight parts oxygen barrier polymer.

15. The method of claim 14 wherein the packaging film of the providing step comprises at least one layer comprising at least about 50% of the oxygen barrier polymer by weight of the total amount of oxygen barrier polymer in the packaging film and at least about 50% of the fullerene material by weight of the total amount of fullerene material in the packaging film.

16. The method of claim 14 wherein:
the oxygen barrier polymer comprises ethylene/vinyl alcohol copolymer; and
the packaging film of the providing step comprises at least about 0.1 weight parts of the fullerene material per 100 weight parts oxygen barrier polymer.

17. The method of claim 14 wherein:
the oxygen barrier polymer comprises vinylidene chloride polymer; and
the packaging film of the providing step comprises at least about 0.1 weight parts of the fullerene material per 100 weight parts oxygen barrier polymer.

18. The method of claim 14 wherein:
the oxygen barrier polymer comprises polyamide; and
the packaging film of the providing step comprises at least about 0.1 weight parts of the fullerene material per 100 weight parts oxygen barrier polymer.

19. The method of claim 14 wherein the packaging film of the providing step comprises:
100 weight parts oxygen barrier polymer selected from one or more of polyvinyl alcohol, polyalkylene carbonate, polyester, and polyacrylonitrile; and
at least about 0.1 weight parts of the fullerene material per 100 weight parts oxygen barrier polymer.

20. The method of claim 1 wherein the step of exposing to the effective amount of radiation energy occurs within at most about 30 seconds.

21. The method of claim 1 wherein the step of exposing to the effective amount of radiation energy occurs within at most about 1 second.

22. The method of claim 1 wherein the radiation exposure step comprises exposing to an effective amount of non-ionizing radiation comprising at least about 20% visible light energy.

23. The method of claim 1 wherein the radiation exposure step comprises exposing to an effective amount of non-ionizing radiation comprising at least about 20% infrared light energy.

24. The method of claim 1 wherein the radiation exposure step comprises exposing to an effective amount of non-ionizing radiation comprising at least about 20% ultraviolet light energy.

25. The method of claim 1 wherein the radiation exposure step comprises exposing to an effective amount of ionizing radiation comprising at least about 20% electron beam energy.

26. The method of claim 1 wherein the packaging film of the providing step comprises at least one layer comprising at least about 0.5 weight % fullerene material by weight of the layer.

27. The method of claim 1 wherein the exposing step structurally disrupts at least a portion of the fullerene material present in the packaging film of the providing step.

28. The method of claim 1 wherein the exposing step structurally disrupts at least about 50 weight % of the fullerene material present in the packaging film of the providing step.

29. The method of claim 1 wherein:
the packaging film of the providing step is unperforated; and
the exposing of the packaging film to the effective amount of radiation energy causes the packaging film to be perforated with a plurality of apertures.

30. The method of claim 1 wherein the packaging film comprises:
an outer layer of the film; and
one or more discontinuous regions supported by the outer layer of the film, wherein the one or more discontinuous regions comprise at least a portion of the fullerene material.

31. The method of claim 1 wherein the fullerene material comprises spherical fullerenes.

32. The method of claim 1 wherein the fullerene material comprises multi-walled carbon nanotubes.

33. The method of claim 1 wherein the fullerene material comprises carbon nanocones.

34. The method of claim 1 wherein the fullerene material comprises carbon nano-onions.

35. The method of claim 1 wherein the fullerene material comprises bowl-shaped fullerenes.

36. A packaging film comprising at least one layer comprising:
100 weight parts of oxygen barrier polymer selected from one or more of ethylene/vinyl alcohol copolymer, polyvinyl alcohol, vinylidene chloride polymer, polyalkylene carbonate, polyester, polyacrylonitrile, and polyamide; and
at least about 0.001 weight parts of fullerene material per 100 weight parts oxygen barrier polymer, wherein the fullerene material is selected from one or more of spherical fullerenes, bowl-shaped fullerenes, multi-walled carbon nanotubes, carbon nanocones, and carbon nano-onions.

37. The film of claim 36 wherein the at least one layer comprises at least about 60% oxygen barrier polymer and at least about 0.1% fullerene material based on the weight of the at least one layer.

38. The film of claim 36 wherein the fullerene material comprises spherical fullerenes.

39. The film of claim 36 wherein the fullerene material comprises multi-walled carbon nanotubes.

40. The film of claim 36 wherein the fullerene material comprises carbon nanocones.

41. The film of claim 36 wherein the fullerene material comprises carbon nano-onions.

42. The film of claim 36 wherein the fullerene material comprises bowl-shaped fullerenes.

43. The film of claim 36 wherein the oxygen barrier polymer comprises ethylene/vinyl alcohol copolymer.

44. The film of claim 36 wherein the oxygen barrier polymer comprises vinylidene chloride polymer.

45. The film of claim 36 wherein the oxygen barrier polymer is selected from one or more of polyvinyl alcohol, polyalkylene carbonate, polyester, polyacrylonitrile, and polyamide.

46. The film of claim 36 wherein the packaging film of the providing step has an average transparency of at least about 85%.

47. A packaged food product comprising:
a package comprising the packaging film of claim 36 and defining an interior space;
a food product enclosed in the interior space of the package; and a modified atmosphere enclosed in the interior space of the package.

48. A method of supplying a packaged food product comprising the following steps:

providing the packaged food product of claim 47; and exposing the packaging film of the packaged food product to an amount of radiation energy effective to increase the oxygen transmission rate of the packaging film by at least about 100 cubic centimeters (at standard temperature and pressure) per square meter per day per 1 atmosphere of oxygen pressure differential measured at 0% relative humidity and 23° C.

49. A packaging film comprising:

at least one layer; and one or more discontinuous regions supported by the at least one layer, wherein the one or more discontinuous regions comprise at least about 0.001 weight % of fullerene material based on the weight of the film.

50. The film of claim 49 wherein the at least one layer is an outer layer of the film.

51. The film of claim 49 wherein the at least one layer is an internal layer of the film, whereby the one or more discontinuous regions are between at least two layers of the film.

* * * * *